Jan. 29, 1952
J. P. SOUHART
2,583,609
CONTROL MEANS FOR CHAIN SHIFTING
CHANGE-SPEED GEARS FOR CYCLES
Filed Feb. 25, 1948
2 SHEETS—SHEET 1
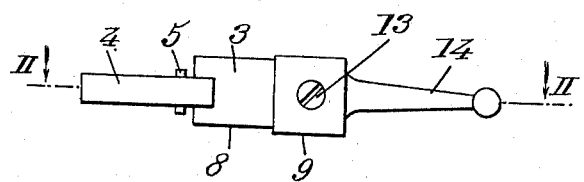
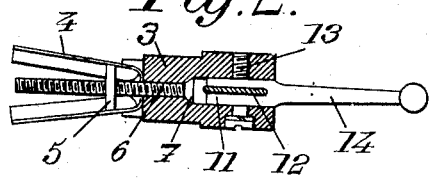
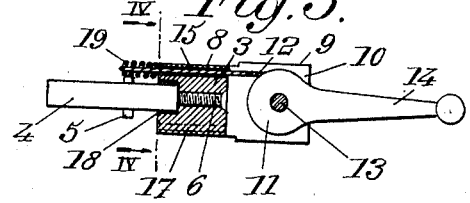
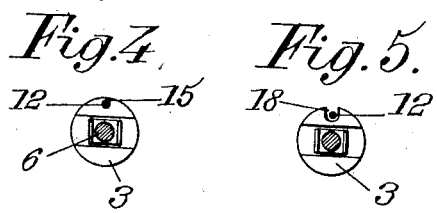 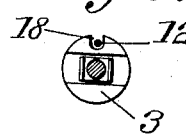
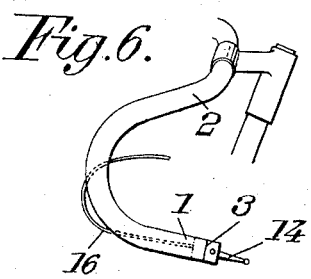
INVENTOR
JACQUES PAUL SOUHART
BY
Geo. M. Strauss
AGT.

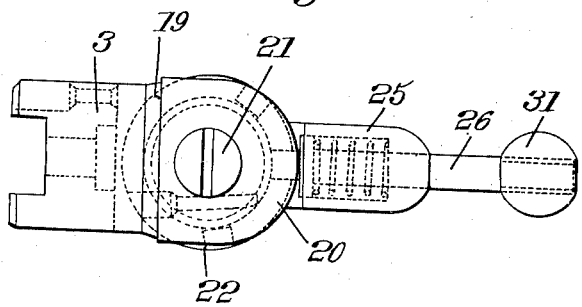
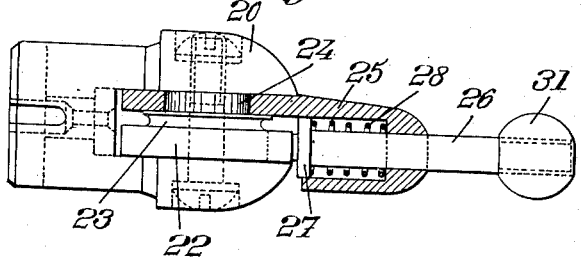
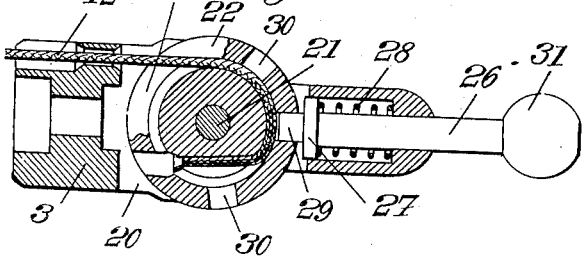

Patented Jan. 29, 1952

2,583,609

UNITED STATES PATENT OFFICE 2,583,609

CONTROL MEANS FOR CHAIN SHIFTING CHANGE-SPEED GEARS FOR CYCLES

Jacques Paul Souhart, Paris, France, assignor to "Les Brevets Souhart" S. A., Paris, France, a society of France Application February 25, 1948, Serial No. 10,628
In France September 6, 1943

6 Claims. (Cl. 74—489)

1

The present invention relates to control means for chain shifting change speed devices and analogous systems for bicycles, motorcycles and similar vehicles.

Bicycles fitted with change speed devices generally include a control lever mounted on one tube of the frame within reach of the cyclist's hand and adapted to be brought into various desired positions.

This arrangement has the drawback of compelling the cyclist, in order to perform the speed changing operation, to remove his hand from the handle-bar, which may be somewhat inconvenient when, for instance, at the bottom of a hill, the cyclist finds he cannot keep the gear ratio presently in operation. This drawback is still more serious in the case of bicycles having a driving device operated by means of an oscillating handle-bar or the like.

The device according to the present invention, which obviates these drawbacks, includes in combination with the handle bar of a cycle, in particular a bicycle, a grooved pulley for operating the chain shifter cable pivoted on a spindle which is mounted at the free end of the handle bar tube, said pulley being rigid with an operating handle mounted in line with said end of the handle bar tube, in order thus to enable the cyclist to operate his change speed device without having to leave the handle bar, thus avoiding any loss of effort.

Preferred embodiments of this invention will be hereinafter described with reference to the accompanying drawings, given merely by way of example and in which:

Fig. 1 is a general side elevational view of the device;

Fig. 2 is a section on the line II—II of Fig. 1;

Fig. 3 is a longitudinal section in a plane at right angles to the section plane of Fig. 2;

Fig. 4 is a transverse section on the line IV—IV of Fig. 3;

Fig. 5 is a modification of Fig. 4;

Fig. 6 is a fragmentary perspective view of a handle-bar on which the device of Figs. 1 to 3 has been fitted;

Fig. 7 is a lateral elevational view of another embodiment of the device according to the invention ready to be fitted on the end of the handle-bar of a bicycle;

Fig. 8 is a view similar to Fig. 7, certain elements being removed or partly shown in section;

Fig. 9 is a sectional view of the device of Fig. 7.

2

Referring first to Figs. 1 to 6, in one of the branches 1 of the handle-bar 2 of a bicycle is engaged a plug piece 3 adapted to be kept in fixed position with respect to this handle-bar by means of a locking wedge 4 the opening of which is controlled, in a known manner, by a nut 5 mounted on a screw 6, having for instance a slotted head 7.

Plug 3 preferably includes, as shown in Fig. 1, a portion 8 of a diameter substantially equal to the inner diameter of the handle-bar tube 1, the second or end portion 9 preferably having a diameter equal to the outer diameter of the handle-bar branch in such manner as to be flush with the outer surface of this branch in the assembled position shown in Fig. 6.

In the portion of large diameter 9 of the mass is provided a mortise 10 in which is engaged pulley 11, which carries the chain shifter control cable 12, said pulley being pivoted on a spindle 13 passing through end portion 9, and this pulley is rigid with a control lever 14.

The chain shifter control cable, fixed on pulley 11 in the usual manner, passes through a channel 15 of piece 3 (Fig. 3), to connect with the chain shifter (not shown on the drawing). Cable 12 passes either inside the tubes of the frame (not shown), or outside the handle-bar 2 through a suitable orifice provided for instance at 16 (Fig. 6).

Piece 3 might further include a second channel 17 indicated in dash-and-dot lines in Fig. 3 for use when the chain shifter requires it.

Of course, instead of providing in piece 3 a hole or channel such as 15 (Fig. 4), I might provide in said piece one or several notches such as 18 (Fig. 5), for the cable or cables 12.

The inward edge of the piece 3 then acts as an abutment for the end of the sheath 19 which surrounds cable 12 and passes to the outside of the handle bar through hole 16. Of course, I may, if so desired, cause sheath 19 to bear upon the handle-bar around hole 16.

Owing to the above described arrangement, when the chain shifter is operated by lowering lever 14, the cyclist can do this without modifying the position of his hand on the branch 1 of the handle bar, by merely moving down his wrist to act on lever 14. The cyclist thus keeps the possibility of supplying his maximum effort whatever be the kind of bicycle he is riding, which enables him, in particular when climbing a hill, to change gear without slowing down or reducing his effort ever so little.

The device may of course be mounted either on the left hand branch or on the right hand branch of the handle-bar according to the preference of the cyclist.

Instead of mounting pulley 11 in a piece, fixed in the end of the branch of the handle-bar as shown in Fig. 6, the axis of articulation 13 of said pulley might be engaged directly in the end of the handle-bar, the guiding of the pulley 11 being obtained either through side elements fixed and housed on the end of the handle-bar, or through a suitable shaping of said hand of the handle-bar which might then include two flat faces, for instance vertical ones, acting as guiding side members.

The device can be made in any suitable material, have any suitable shape, lever 14 being eventually movable, either in the vertical direction, or in a horizontal or inclined direction.

In the embodiment of Figs. 7 to 9, plug 3, intended to engage in the end of the handle-bar, (not shown), of a bicycle (the inward engagement of said plug being limited by shoulder 19 which comes to bear against the outer edge of the handle-bar) carries, on the outward side thereof, a fork-shaped element 20 in which is mounted a spindle 21 on which is journalled the pulley or wheel 22 in which is provided the groove 23 which receives the cable 12 for controlling the chain shifter (not shown).

Wheel 22 includes a journal 24 on which is pivoted an arm 25 which can thus oscillate freely and is shaped to form a lateral guide member for said cable. In this arm 25 is slidably fitted a rod 26 provided with a collar 27 on which acts a thrust spring 28 for engaging the end portion 29, acting as a bolt, of rod 26 into notches 30 provided in the periphery of wheel 22.

A head 31, of spherical or other shape, is fixed to the outer end of rod 26 to facilitate its operation.

This arrangement permits of modifying at will the relation of pulley 22 with respect to the lever 26 for operating this pulley. Before performing the gear changing operation, the cyclist can thus prepare this operation by preliminarily bringing the end portion or bolt 29 constituted by the end of rod 26 into the notch or recess 30 that corresponds to the gear ratio he wishes to obtain, the operation proper being thus made easier at the time it is to be carried out. It will be readily understood that this arrangement facilitates the cyclist's task since he is enabled to prepare the change of gear at the most favorable time, the gear changing operation being then reduced to a practically instantaneous gesture which is made at the desired time without any hindrance for the cyclist.

The operating lever 26 might also be connected with the pulley 22 through a system of gears, preferably with a suitable multiplication, making it possible to obtain a great displacement of the control cable of the chain shifter for a displacement of relatively small amplitude of the lever 26. In this case, lever 26 and wheel 22 might be mounted on different axes. This operation might also be obtained by providing on a disc rigid with rod 26, a helical inclined surface acting directly on the end of the cable such as 12.

In a general manner, while in the above decription, it has been disclosed what is deemed to be practical and efficient embodiments of this invention, it should be well understood that the same should be limited thereto as there might be changes made in the arrangement, disposition and form of the parts without departing from the principle of the present invention as comprehended within the scope of the accompanying claims.

Having thus described the invention, what is claimed as new and desired to be secured by Letters Patent, is:

1. In a bicycle and like vehicle, the combination with the handle bar of said vehicle, of a substantially cylindrical plug piece fitted in the rear end portion of one handle of said handle bar, a pulley journalled in said plug piece about an axis transverse to the direction of said handle, a change speed gear control cable connected to said pulley, and a lever operatively connected with said pulley for manually actuating it, said lever extending on the outside of said handle to the rear thereof, whereby it can be actuated by the cyclist's hand without said hand being removed from said handle.

2. In a bicycle and like vehicle, the combination with the handle bar of said vehicle, of a substantially cylindrical plug piece fitted in the rear end portion of one handle of said handle bar, a pulley journalled in said plug piece about an axis transverse to the direction of said handle, a change speed gear control cable connected to said pulley, and a lever carried by said pulley in fixed radial position with respect thereto for manually actuating it, said lever extending on the outside of said handle to the rear thereof, whereby it can be actuated by the cyclist's hand without said hand being removed from said handle, and said lever, in neutral position, being substantially in line with said handle.

3. In a bicycle and like vehicle, the combination with the handle bar of said vehicle, of a substantially cylindrical plug piece insertable in the rear end portion of one handle of said handle bar, an expansible wedge carried by said plug piece for fixation thereof in said handle, a pulley journalled in said plug piece about an axis transverse to the direction of said handle, a change speed gear control cable connected to said pulley, and a lever operatively connected with said pulley for manually actuating it, said lever extending on the outside of said handle to the rear thereof, whereby it can be actuated by the cyclist's hand without said hand being removed from said handle.

4. In a bicycle and like vehicle, the combination with the handle bar of said vehicle, of a substantially cylindrical plug piece fitted in the rear end portion of one handle of said handle bar, a pulley journalled in said plug piece about an axis transverse to the direction of said handle, a change speed gear control cable connected to said pulley, a lever pivoted to said pulley about the axis thereof extending on the outside of said handle to the rear thereof, whereby it can be actuated by the cyclist's hand without said hand being removed from said handle, and means for locking said lever with respect to said pulley in any of a plurality of predetermined positions.

5. In a bicycle and like vehicle the combination with the handle bar of said vehicle, of a substantially cylindrical plug piece fitted in the rear end portion of one handle of said handle bar, a pulley journalled in said plug piece about an axis transverse to the direction of said handle, a change speed gear control cable connected to said pulley, said pulley being provided with a plurality of peripheral notches, a lever pivoted to said pulley about the axis thereof extending on the outside of said handle to the rear thereof, whereby it can be actuated by the cyclist's hand without said hand being removed from said handle, a part slidable in said lever in the radial direction of said pulley and adapted to engage any of said notches and spring means for urging said part toward the periphery of said pulley.

6. Control means for change speed gear mechanism of bicycles and similar vehicles equipped with a handle bar and a cable to operate said gear mechanism; comprising a member having means for providing a connection with one end of said handle bar, said member being provided with an axle extending transversely to said end of said handle bar when connected to the latter, a pulley supported by said axle and provided with means for anchoring said cable thereon, and an operating lever for said pulley swingably supported on said axle and adapted to extend rearwardly of said handle bar, said lever extending in radial direction to said axle of said pulley whereby said operating lever may be moved about said axle by means of part of a person's hand without removing the latter from said handle bar.

JACQUES PAUL SOUHART.

REFERENCES CITED

The following references are of record in the file of this patent:

UNITED STATES PATENTS

| Number | Name | Date |
|---|---|---|
| 1,260,465 | Shakespeare | Mar. 26, 1918 |

FOREIGN PATENTS

| Number | Country | Date |
|---|---|---|
| 25,569 | France | Jan. 13, 1923 |
| 395,412 | France | Feb. 27, 1909 |
| 515,463 | Great Britain | Dec. 5, 1939 |